US011137499B2

(12) United States Patent
Meng

(10) Patent No.: US 11,137,499 B2
(45) Date of Patent: Oct. 5, 2021

(54) SYSTEM AND METHOD FOR DETECTING GPS SIGNAL SPOOFING

(71) Applicant: TOYOTA MOTOR ENGINEERING & MANUFACTURING NORTH AMERICA, INC., Erlanger, KY (US)

(72) Inventor: Ming Michael Meng, Novi, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 368 days.

(21) Appl. No.: 15/885,445

(22) Filed: Jan. 31, 2018

(65) Prior Publication Data
US 2019/0235086 A1    Aug. 1, 2019

(51) Int. Cl.
| | | |
|---|---|---|
| *G01S 19/21* | (2010.01) | |
| *G01S 19/23* | (2010.01) | |
| *G05D 1/02* | (2020.01) | |
| *H04K 3/00* | (2006.01) | |
| *G05D 1/00* | (2006.01) | |

(52) U.S. Cl.
CPC ............ *G01S 19/215* (2013.01); *G01S 19/23* (2013.01); *G05D 1/0061* (2013.01); *G05D 1/0278* (2013.01); *H04K 3/90* (2013.01); *G05D 2201/0213* (2013.01)

(58) Field of Classification Search
CPC ........ G01S 19/215; G01S 19/48; G01S 19/21; G01S 19/05; G01S 19/07; G01S 19/23; G01S 19/31; G01S 19/41; G01S 19/47
See application file for complete search history.

(56) References Cited

U.S. PATENT DOCUMENTS

| | | | |
|---|---|---|---|
| 7,729,679 B1 * | 6/2010 | Lee | H04B 1/1027 |
| | | | 455/295 |
| 9,466,881 B1 * | 10/2016 | Berry | G01S 19/03 |
| 9,553,694 B1 | 1/2017 | Elangovan et al. | |
| 9,753,143 B2 | 9/2017 | Bianchi et al. | |
| 2002/0186150 A1 * | 12/2002 | Sweetapple | G01S 19/21 |
| | | | 340/988 |
| 2009/0171577 A1 * | 7/2009 | Roumeliotis | G01C 21/30 |
| | | | 701/533 |
| 2013/0002477 A1 * | 1/2013 | Dehnie | G01S 19/47 |
| | | | 342/357.3 |
| 2015/0084812 A1 | 3/2015 | Sernik | |
| 2015/0264664 A1 * | 9/2015 | Kawasaki | H04W 24/10 |
| | | | 370/329 |
| 2016/0223678 A1 * | 8/2016 | Kim | G01S 19/215 |
| 2016/0266259 A1 | 9/2016 | Robinson et al. | |

(Continued)

*Primary Examiner* — Redhwan K Mawari
(74) *Attorney, Agent, or Firm* — Oblon, McClelland, Maier & Neustadt, L.L.P.

(57) ABSTRACT

A method, a system, and computer readable medium for detecting interference with a navigation system are provided. The method includes detecting a global positioning system (GPS) signal via the navigation system of a vehicle, determining a signal strength of the GPS signal, determining a location of the vehicle based on the GPS signal, and determining a first attribute and a second attribute. The first attribute is determined as a function of the signal strength. The second attribute is determined as a function of the location of the vehicle. The method further includes outputting an alert indicating an interference with the navigation system when the first attribute and the second attribute are true.

16 Claims, 4 Drawing Sheets

(56) References Cited

U.S. PATENT DOCUMENTS

| | | | |
|---|---|---|---|
| 2016/0282471 A1* | 9/2016 | Hanika-Heidl | G01S 19/48 |
| 2017/0031026 A1 | 2/2017 | Elliott et al. | |
| 2017/0158213 A1 | 6/2017 | Mathews et al. | |
| 2018/0229738 A1* | 8/2018 | Nilsson | B60W 10/184 |
| 2019/0220026 A1* | 7/2019 | Vawter | B60Q 1/50 |
| 2019/0235086 A1* | 8/2019 | Meng | G05D 1/0278 |

* cited by examiner

302

| First attribute | Second attribute | Navigation system |
|---|---|---|
| Low | Low | No spoofing detected |
| Low | High | No spoofing detected |
| High | Low | No spoofing detected |
| High | High | Spoofing detected |

| First attribute | Second attribute | Navigation system |
|---|---|---|
| Low | Low | No spoofing detected |
| Low | High | Warning |
| High | Low | Warning |
| High | High | Spoofing detected |

*FIG. 3B*

SYSTEM AND METHOD FOR DETECTING GPS SIGNAL SPOOFING

BACKGROUND

Vehicles are equipped with various types of navigation and communication devices. Situation of spoofing or hacking of navigation devices may be dangerous to the driver and occupants of the vehicle. U.S. Pat. No. 9,553,694 B1 entitled "RF jamming mitigation system and method" by Elangovan describes a jamming detection system for a vehicle.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

The present disclosure relates to a method for detecting interference with a navigation system. The method includes detecting a global positioning system (GPS) signal via the navigation system of a vehicle, determining a signal strength of the GPS signal, determining a location of the vehicle based on the GPS signal, and determining a first attribute and a second attribute. The first attribute is determined as a function of the signal strength. The second attribute is determined as a function of the location of the vehicle. The method further includes outputting an alert indicating an interference with the navigation system when the first attribute and the second attribute are true.

The present disclosure relates to a system for detecting interference with a navigation system. The system includes a vehicle and a navigation system. The navigation system includes processing circuitry. The processing circuitry is configured to detect a global positioning system (GPS) signal via the navigation system of the vehicle, determine a signal strength of the GPS signal, determine a location of the vehicle based on the GPS signal, and determine a first attribute and a second attribute. The first attribute is determined as a function of the signal strength. The second attribute is determined as a function of the location of the vehicle. The processing circuitry is further configured to output an alert indicating an interference with the navigation system when the first attribute and the second attribute are true.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 3A and 3B are schematics that show look-up tables to determine a status of a navigation system according to one example.

DETAILED DESCRIPTION

Figure 1:
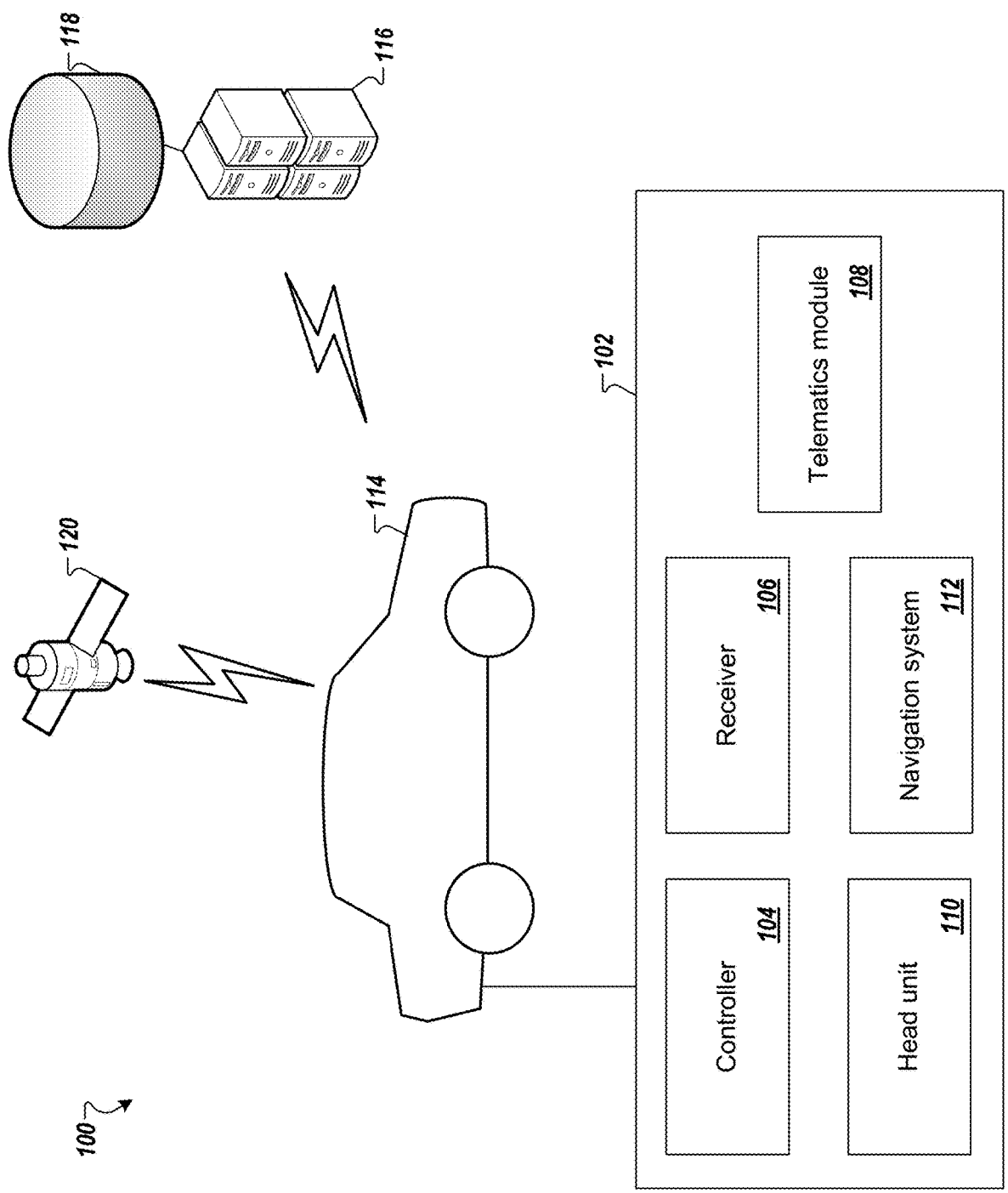
FIG. 1 is a schematic of a system environment for detecting and reporting global positioning system (GPS) signal spoofing according to one example.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Referring now to the drawings, wherein like reference numerals designate identical or corresponding parts throughout several views, the following description relates to a system and associated methodology for detecting global positioning system (GPS) signal spoofing.

A navigation of system may be subject to a cyber-attack. A third-party (e.g., hacker) may interfere with location data. For example, the navigation system may show that the vehicle is navigating on a specific route where is the actual location of the vehicle may be different. The navigation system may show the driver navigating from Michigan to Florida. However, the actual navigation may be from Michigan to New York. The driver may not realize the diversion by the cyber-attack. Further, the third-party may hack or disable the navigation system of a plurality of vehicles such as to create a traffic jam or crowding that may be easily targeted during a military attack.

The system described herein detects attempts to hack into the navigation system and output warning to the driver about the possible hack of the navigation system. The system may also automatically disable the navigation system. The driver may then use traditional navigation methods to navigate to their destination.

FIG. 1 is a schematic of a system environment 100 of a vehicle 114 for detecting and reporting GPS signal spoofing according to one example. The vehicle 114 may be any type of vehicle such as a car, truck, bus, airplane, helicopter, or ship. The vehicle 114 may be gas-powered, diesel powered, electric, or solar-powered. The vehicle 114 may be actively operated by a driver or may be partially or completely autonomous or self-driving. The system 102 may include a controller 104, a receiver 106, a telematics module 108, a head unit 110, and a navigation system 112.

The controller 104 may include any computing device configured to execute computer-readable instructions. For example, the controller 104 may include a processor and a memory. The controller 104 may communicate with a remote server 116 via a vehicle telematics device (e.g., the telematics module 108). The vehicle telematics device such as telematics module 108 may communicate via any wireless network such as high bandwidth GPRS/IXRIT channel, RF transmission, a wide area network (WAN) or local area network (LAN), WiFi, Satellite, a cloud-based communication, or a mobile communication network such as GSM or CDMA. The controller 104 may detect a spoofing attempt or interference with the navigation system 112 based on a signal level of a received GPS signal and a difference between successive determined locations.

The telematics module 108 may be a data communication module (DCM) that provides communications over a network to any server that may be included with multiple services available to the vehicle user.

The head unit 110 may receive input from the vehicle user via a user interface. The user interface may include buttons, a touch screen, a microphone, and a speaker. The head unit 110 may output a voice alert message via the speaker when a spoofing event is detected as described further below.

The receiver 106 may receive a GPS signal from a satellite 120 via at least one antenna. The receiver 106 may be located inside the vehicle such as in the instrument panel. In other examples, the receiver 106 may be located on top of the vehicle. The received signal is sent to the navigation system 112. The navigation system 112 identifies the location of the vehicle (e.g., latitude and longitude) based on the received signal.

The navigation system 112 may store maps of different geographical locations. In one implementation, the receiver 106 may determine the location of the vehicle and send the latitude and longitudinal coordinates corresponding to the location of the vehicle to the navigation system 112. The navigation system 112 may include a separate display from the head unit 110. In other implementations, the navigation system 112 may be connected to the display of the head unit 110.

The remote server 116 may be connected to a database 118. The remote server 116 may identify the vehicle 114 based on a vehicle identification number (VIN).

The modules described herein may be implemented as either software and/or hardware modules and may be stored in any type of computer-readable medium or other computer storage device. For example, each of the modules described herein may be implemented in circuitry that is programmable (e.g. microprocessor-based circuits) or dedicated circuits such as application specific integrated circuits (ASICS) or field programmable gate arrays (FPGAS). In one embodiment, a central processing unit (CPU) could execute software to perform the functions attributable to each of the modules described herein. The CPU may execute software instructions written in a programing language such as Java, C, or assembly. One or more software instructions in the modules may be embedded in firmware, such as an erasable programmable read-only memory (EPROM).

Figure 2:
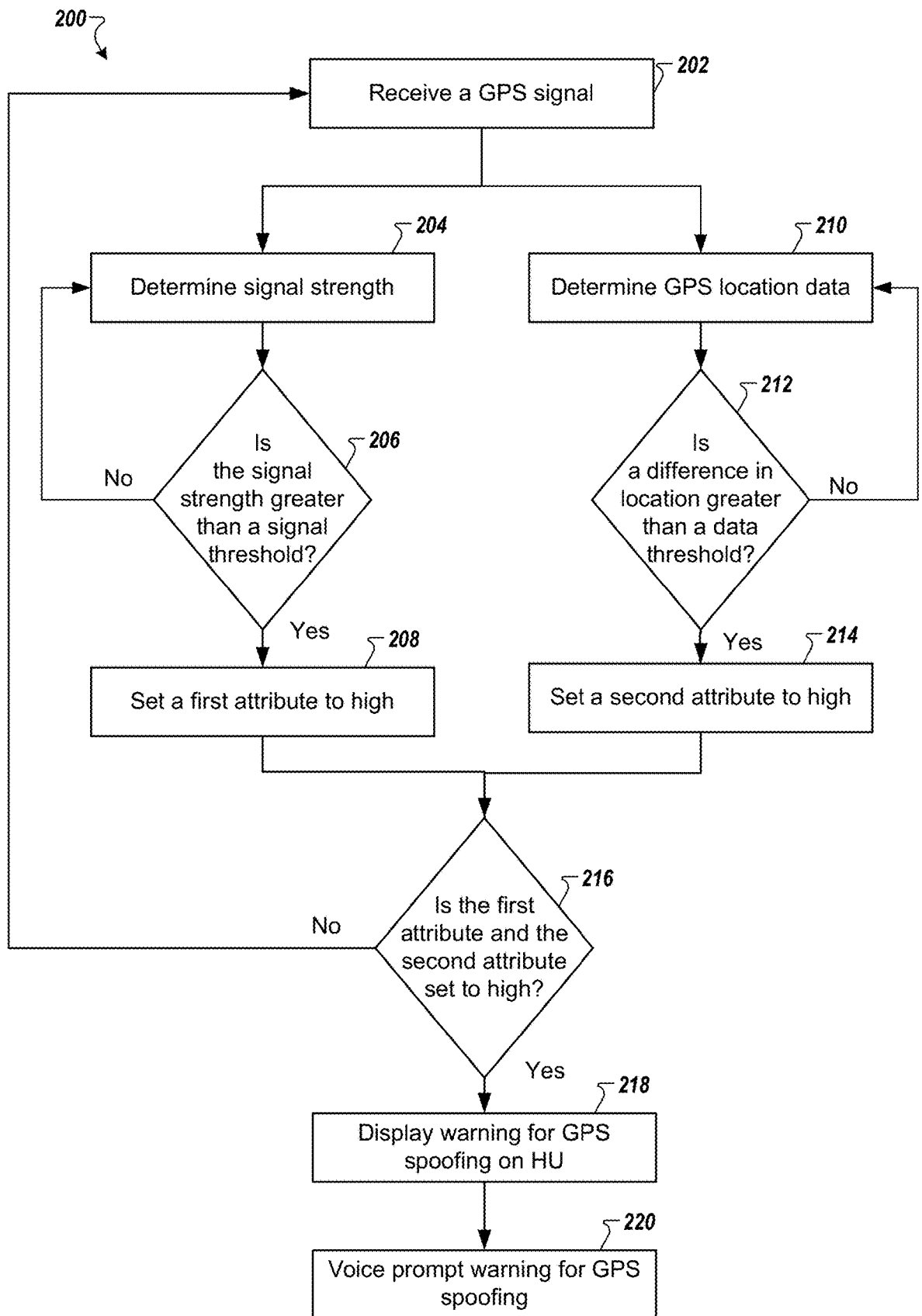
FIG. 2 is a flowchart for detecting spoofing attempts according to one example.

FIG. 2 is a flowchart for a process 200 for detecting spoofing attempts according to one example. The process 200 may be implemented by the controller 104.

At step 202, a GPS signal may be received by the receiver 106 antenna. The GPS signal has signal properties including signal strength. The receiver 106 may communicate the received signal to the controller 104.

At step 204, the GPS signal level or the physical signal level may be determined by the controller 104.

At step 206, the controller 104 may check to see whether the signal strength is greater than a signal threshold. In response to determining that the signal strength is greater than the signal threshold, the process proceeds to step 208. In response to determining that the signal strength is not greater than the signal threshold, the process proceeds to step 204. In one implementation, the controller 104 may check to see whether a difference between the signal strength and the signal threshold is greater than a predetermined value. In response to determining that the difference is greater than the predetermined value, the process proceeds to step 208. In response to determining that the difference is not greater than the predetermined value, the process proceeds to step 204.

The signal threshold may be set by the OEM. The signal threshold may be based on an average power level at ground level (e.g., −130 dBm). A tolerance band may be ±15 dB mw to 20 dB mw. The tolerance band may be set by the manufacturer of the vehicle 114 based on the specification of the navigation system 112. In one implementation, the signal threshold may be based on environmental factors including current weather conditions.

At step 208, the controller 104 may set a first attribute associated with the signal strength to "true" or "high." Then, the process proceeds to step 216.

At step 210, the navigation system 112 may determine GPS location data associated with a current location from the received signal (e.g., longitudinal and latitude coordinates). The navigation system 112 or the controller 104 may also determine a difference in location between a last location of the vehicle and the current location.

At step 212, the controller 104 may check to see whether the difference in location is greater than a location threshold. In response to determining that the difference is greater than a location threshold, the process proceeds to step 214. In response to determining that the difference is not greater than the location threshold, the process proceeds to step 210. The location threshold may be set to 0.2 miles, 0.4 miles, 0.5 miles, or the like based on the navigation system type.

At step 214, the controller 104 may set a second attribute associated with the location data to "true" or "high." Then, the process proceeds to step 216.

At step 216, the controller 104 may check to see whether the first attribute and the second attribute are both set to high. Step 216 may be implemented using a 2 input AND gate in which the first input may correspond to the first attribute and the second input may correspond to the second attribute. In response to determining that the first and the second attribute are set to high or true, the process proceeds to step 218. In response to determining that the first and the second attribute are not set to high, the process proceeds to step 202, where a new signal is received by the receiver 106.

At step 218, the controller 104 may display a warning on the head unit 110.

At step 220, the controller 104 may send the head unit 110 a signal that causes the head unit 110 to output a voice alert message via the speaker indicating that a spoofing event is detected and the navigation system is not safe to be used.

The navigation system 112 may be disabled in response to detecting the spoofing event. In one implementation, the navigation system 112 may be partially disabled. For example, the navigation system 112 may display pre-stored maps without the current location of the user.

The controller 104 may record information associated with the spoofing event in the memory along with a timestamp and location data associated with the last accurate location. The information may include the signal strength.

The controller 104 may output information associated with the spoofing event or interference event to the server 116 (i.e., timestamp, location data, vehicle identification) via the telematics module 108. The information may be stored in the database 118. The server 116 may aggregate information received from a plurality of vehicle. Further, the server 116 may determine a location with a high spoofing probability. The server 116 may select the signal threshold and location threshold based on the location. For example, the server 116 may use a lower tolerance level in region with high spoofing probability. The server 116 may output the thresholds to the vehicle 114.

The controller 104 may check to see whether an autonomous mode of the vehicle 114 is active. In response to determining that the autonomous mode is active, the controller 104 may deactivate the autonomous mode. For example, the controller 104 may output an alert to the user that the autonomous mode will be deactivated. Then, the controller 104, using the autonomous mode, may park and turn off the vehicle.

FIG. 3A is a schematic that show a look-up table 302 for determining a status of the navigation system according to one example. As described in FIG. 2, the spoofing is detected when a first attribute and the second attribute are set to high. In other implementations, a warning may be output if one of the attribute is high as shown in table 304 of FIG. 3B. For example, in response to determining that the first attribute is set to high and the second attribute is set to low, the controller 104 may output a warning to the user via a display of the head unit 110 or a voice message via the speaker of the head unit 110.

A system which includes the features in the foregoing description provides numerous advantages to users. The system increases the safety of the drivers. In particular, the system and methodologies described herein increase the safety of autonomous and semi-autonomous vehicles by detecting interference with the navigation systems that may lead to accidents.

Figure 4:
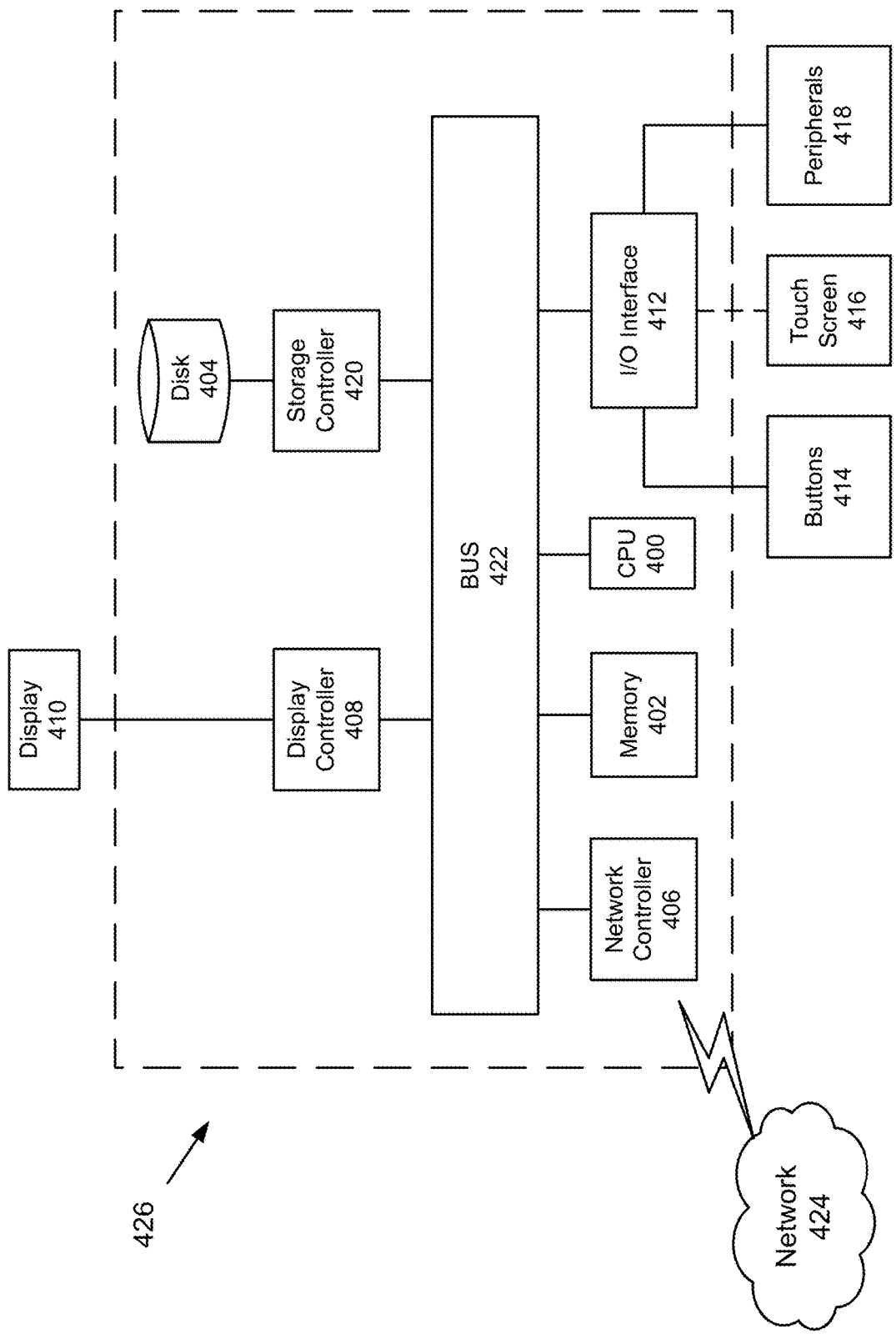
FIG. 4 is a block diagram of a computer according to one example.

In one implementation, the functions and processes of the controller 104 may be implemented by a computer 426. Next, a hardware description of the computer 426 according to exemplary embodiments is described with reference to FIG. 4. In FIG. 4, the computer 426 includes a CPU 400 which performs the processes described herein. The process data and instructions may be stored in memory 402. These processes and instructions may also be stored on a storage medium disk 404 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 426 communicates, such as a server or computer.

Further, the claimed advancements may be provided as a utility application, background daemon, or component of an operating system, or combination thereof, executing in conjunction with CPU 900 and an operating system such as Microsoft® Windows®, UNIX®, Oracle® Solaris, LINUX®, Apple macOS® and other systems known to those skilled in the art.

In order to achieve the computer 426, the hardware elements may be realized by various circuitry elements, known to those skilled in the art. For example, CPU 400 may be a Xenon® or Core® processor from Intel Corporation of America or an Opteron® processor from AMD of America, or may be other processor types that would be recognized by one of ordinary skill in the art. Alternatively, the CPU 400 may be implemented on an FPGA, ASIC, PLD or using discrete logic circuits, as one of ordinary skill in the art would recognize. Further, CPU 400 may be implemented as multiple processors cooperatively working in parallel to perform the instructions of the inventive processes described above.

The computer 426 in FIG. 4 also includes a network controller 406, such as an Intel Ethernet PRO network interface card from Intel Corporation of America, for interfacing with network 424. As can be appreciated, the network 424 can be a public network, such as the Internet, or a private network such as LAN or WAN network, or any combination thereof and can also include PSTN or ISDN sub-networks. The network 424 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 426 further includes a display controller 408, such as a NVIDIA® GeForce® GTX or Quadro® graphics adaptor from NVIDIA Corporation of America for interfacing with display 410, such as a Hewlett Packard® HPL2445w LCD monitor. A general purpose I/O interface 412 interfaces with a keyboard and/or mouse 414 as well as an optional touch screen panel 416 on or separate from display 410. General purpose I/O interface also connects to a variety of peripherals 418 including printers and scanners, such as an OfficeJet® or DeskJet® from Hewlett Packard®.

The general purpose storage controller 420 connects the storage medium disk 404 with communication bus 422, which may be an ISA, EISA, VESA, PCI, or similar, for interconnecting all of the components of the computer 426. A description of the general features and functionality of the display 410, keyboard and/or mouse 414, as well as the display controller 408, storage controller 420, network controller 406, and general purpose I/O interface 412 is omitted herein for brevity as these features are known.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for detecting interference with a navigation system, the method comprising:
   detecting a global positioning system (GPS) signal via the navigation system of a vehicle;
   determining, using processing circuitry, a signal strength of the GPS signal;
   determining, using the processing circuitry, a location of the vehicle based on the GPS signal;
   determining, using the processing circuitry, a first attribute as a function of the signal strength and a second attribute as a function of the location of the vehicle including:
      comparing the signal strength with a signal threshold,
      assigning a true value to the first attribute when a difference between the signal strength and the signal threshold is greater than a predetermined value,
      determining a difference between the location of the vehicle and a previous location of the vehicle,
      assigning a true value to the second attribute when the difference is greater than a location threshold,
      determining whether the first attribute is true or false in a case that the second attribute is determined to be false, and
      determining whether the second attribute is true or false in a case that the first attribute is determined to be false;
   determining an interference with the navigation system is detected when the first attribute and the second attribute are both true;
   determining the interference is not detected when the first attribute is false and the second attribute is true;
   determining the interference is not detected when the first attribute is true and the second attribute is false; and
   outputting an alert indicating the interference with the navigation system when the interference is detected.

2. The method of claim 1, wherein the signal threshold is based on environmental factors.

3. The method of claim 1, further comprising:
   outputting a warning alert when the first attribute is false and the second attribute is true; and
   outputting the warning alert when the first attribute is true and the second attribute is false.

4. The method of claim 1, further comprising:
   outputting information associated with the interference with the navigation system to a remote server, the information including at least a timestamp and location data; and
   aggregating the information received from a plurality of vehicles in the remote server.

5. The method of claim 4, wherein the determining of the first attribute is based on the aggregated information.

6. The method of claim 1, further comprising:
   deactivating an autonomous mode of the vehicle when an interfere nce with the navigation system is detected.

7. The method of claim 1, further comprising:
   deactivating the navigation of the vehicle when an interference with the navigation system is detected.

8. A system for detecting interference with a navigation system, the system comprising:
   a vehicle; and
   a navigation system including processing circuitry configured to
      detect a global positioning system (GPS) signal,
      determine a signal strength of the GPS signal,
      determine a location of the vehicle based on the GPS signal,
      determine a first attribute as a function of the signal strength and a second attribute as a function of the location of the vehicle including:
         compare the signal strength with a signal threshold;
         assign a true value to the first attribute when a difference between the signal strength and the signal threshold is greater than a predetermine d value,
         determine a difference between the location of the vehicle and a previous location of the vehicle,
         assign a true value to the second attribute when the difference is greater than a location threshold,
         determine whether the first attribute is true or false in a case that the second attribute is determined to be false, and
         determine whether the second attribute is true or false in a case that the first attribute is determined to be false,
      determine an interference with the navigation system is detected when the first attribute and the second attribute are both true,
      determine the interference is not detected when the first attribute is false and the second attribute is true,
      determining the interference is not detected when the first attribute is true and the second attribute is false, and
      output an alert indicating the interference with the navigation system when the interference is detected.

9. The system of claim 8, wherein the signal threshold is based on environmental factors.

10. The system of claim 8, wherein the processing circuitry is further configured to:
    output a warning alert when the first attribute is false and the second attribute is true; and
    output the warning alert when the first attribute is true and the second attribute is false.

11. The system of claim 8, wherein the processing circuitry is further configured to:
    output information associated with the interference with the navigation system to a remote server, the information including at least a timestamp and location data; and
    aggregate the information received from a plurality of vehicles in the remote server.

12. The system of claim 11, wherein the determining of the first attribute is based on the aggregated information.

13. The system of claim 8, wherein the processing circuitry is further configured to:
    deactivate an autonomous mode of the vehicle when an interference with the navigation system is detected.

14. The system of claim 8, wherein the processing circuitry is further configured to:
    deactivate the navigation of the vehicle when an interference with the navigation system is detected.

15. The system of claim 8, wherein the alert is output via a speaker of a head unit of the vehicle.

16. A non-transitory computer readable medium storing computer-readable instructions therein which when executed by a computer cause the computer to perform a method for detecting interference with a navigation system, the method comprising:
    detecting a global positioning system (GPS) signal via the navigation system of a vehicle;
    determining a signal strength of the GPS signal;

determining a location of the vehicle based on the GPS signal;
determining a first attribute as a function of the signal strength and a second attribute as a function of the location of the vehicle including:
   comparing the signal strength with a signal threshold,
   assigning a true value to the first attribute when a difference between the signal strength and the signal threshold is greater than a predetermined value,
   determining a difference between the location of the vehicle and a previous location of the vehicle,
   assigning a true value to the second attribute when the difference is greater than a location threshold,
   determining whether the first attribute is true or false in a case that the second attribute is determined to be false, and
   determining whether the second attribute is true or false in a case that the first attribute is determined to be false;
determining an interference with the navigation system is detected when the first attribute and the second attribute are both true;
determining the interference is not detected when the first attribute is false and the second attribute is true;
determining the interference is not detected when the first attribute is true and the second attribute is fats e; and
outputting an alert indicating the interference with the navigation system when the interference is detected.

* * * * *